US012779698B2

(12) United States Patent
Takahashi

(10) Patent No.: US 12,779,698 B2
(45) Date of Patent: Nov. 3, 2026

(54) THIN MOBILE COMMUNICATION TERMINAL, AND CONTROL METHOD AND CONTROL PROGRAM THEREOF

(71) Applicant: Robogarage Singapore Pte. Ltd., Singapore (SG)

(72) Inventor: Tomotaka Takahashi, Otsu (JP)

(73) Assignee: Robogarage Singapore Pte. Ltd., Singapore (SG)

( * ) Notice: Subject to any disclaimer, the term of this patent is extended or adjusted under 35 U.S.C. 154(b) by 272 days.

(21) Appl. No.: 18/206,663

(22) Filed: Jun. 7, 2023

(65) Prior Publication Data

US 2023/0311332 A1 Oct. 5, 2023

Related U.S. Application Data

(63) Continuation of application No. PCT/JP2020/045546, filed on Dec. 7, 2020.

(51) Int. Cl.
*B25J 9/16* (2006.01)
*G06V 20/50* (2022.01)
*H04M 1/02* (2006.01)
*H04M 1/04* (2006.01)
*H04N 23/695* (2023.01)

(52) U.S. Cl.
CPC ............ *B25J 9/1697* (2013.01); *G06V 20/50* (2022.01); *H04M 1/0202* (2013.01); *H04M 1/04* (2013.01); *H04N 23/695* (2023.01)

(58) Field of Classification Search
None
See application file for complete search history.

(56) References Cited

U.S. PATENT DOCUMENTS

D973,033 S 12/2022 Takahashi
2004/0012362 A1 1/2004 Tsurumi
2005/0071047 A1 3/2005 Okabayashi et al.
2006/0200282 A1 9/2006 Lee et al.
(Continued)

FOREIGN PATENT DOCUMENTS

CN 1628274 A 6/2005
CN 104320553 A 1/2015
(Continued)

OTHER PUBLICATIONS

Extended European Search Report dated Sep. 3, 2024, of counterpart European Patent Application No. 20965025.8.
(Continued)

*Primary Examiner* — Christopher A Buksa
(74) *Attorney, Agent, or Firm* — DLA Piper LLP (US)

(57) ABSTRACT

A thin mobile communication terminal includes: a rectangular enclosure; two arms wherein one end of each arm is rotationally supported by a rotary shaft against corresponding one of both side surfaces of long sides of the enclosure; a hand at another end of each arm; a leg provided on one side surface of short sides of the enclosure in an independently movable manner; a rotary motor for rotating the rotary shaft that supports corresponding one of the two arms on one end of the corresponding one of the arms; an imaging unit provided on a main surface of the enclosure; and a controller that controls the rotary motor.

8 Claims, 9 Drawing Sheets

(56) References Cited

U.S. PATENT DOCUMENTS

| | | | | |
|---|---|---|---|---|
| 2010/0171464 | A1* | 7/2010 | Choi | B25J 5/00 320/114 |
| 2017/0106738 | A1* | 4/2017 | Gillett | B62K 11/007 |
| 2017/0178331 | A1 | 6/2017 | Narikawa | |
| 2018/0014709 | A1* | 1/2018 | O'Brien | A47L 9/2884 |
| 2022/0100230 | A1 | 3/2022 | Takahashi | |

FOREIGN PATENT DOCUMENTS

| | | | |
|---|---|---|---|
| CN | 106896807 | A | 6/2017 |
| JP | 2003-285288 | A | 10/2003 |
| JP | 2004282605 | A | 10/2004 |
| JP | 2006-236333 | A | 9/2006 |
| JP | 2006-262426 | A | 9/2006 |
| JP | 2009-177761 | A | 8/2009 |
| JP | 2013-042476 | A | 2/2013 |
| JP | 2016-36899 | | 3/2016 |
| JP | 1 641986 | S | 9/2019 |
| KR | 10-2015-0056425 | A | 5/2015 |
| WO | 2020/250434 | A1 | 12/2020 |

OTHER PUBLICATIONS

Office Action dated Sep. 11, 2024, of counterpart Korea Patent Application No. 10-2023-7019123 along with an English translation.

International Search Report dated Mar. 2, 2021 in counterpart International Application No. PCT/JP2020/045546 w/English translation.

Notice of Preliminary Rejection dated May 23, 2025, from counterpart Korean Patent Application No. 10-2023-7019123.

Office Action dated Mar. 21, 2025, from counterpart Chinese Application No. 202080107670.7.

Office Action dated Mar. 24, 2025, from counterpart Taiwanese Application No. 110145369.

Office Action dated Oct. 20, 2025, from counterpart European Application No. 20965025.8.

* cited by examiner

FIG. 2A
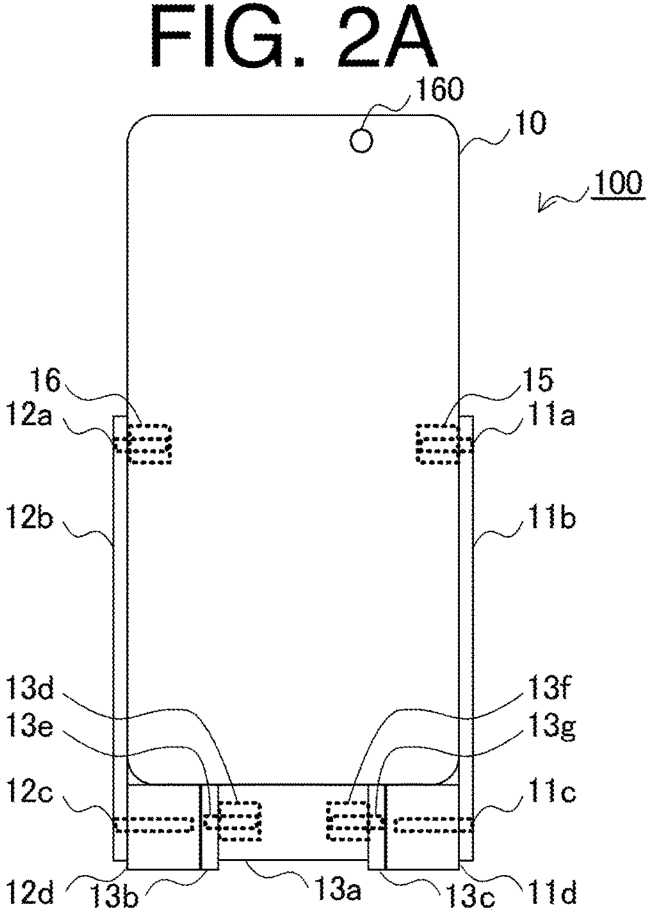
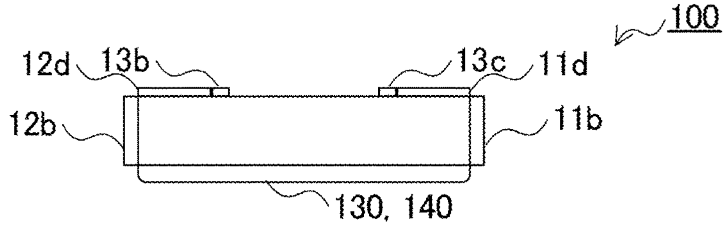
FIG. 2B
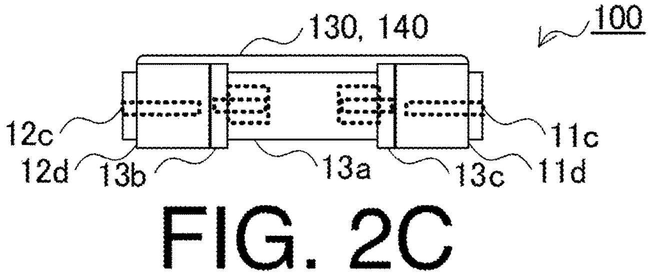
FIG. 2C

FIG. 3A
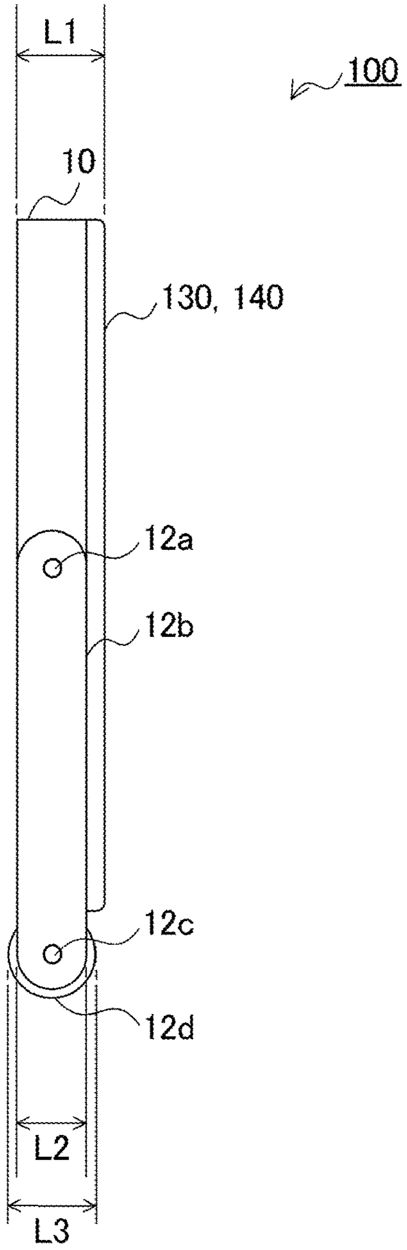
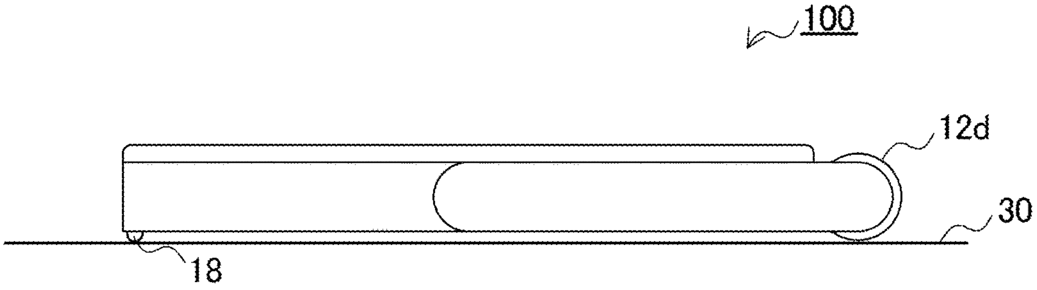
FIG. 3B

FIG. 4A
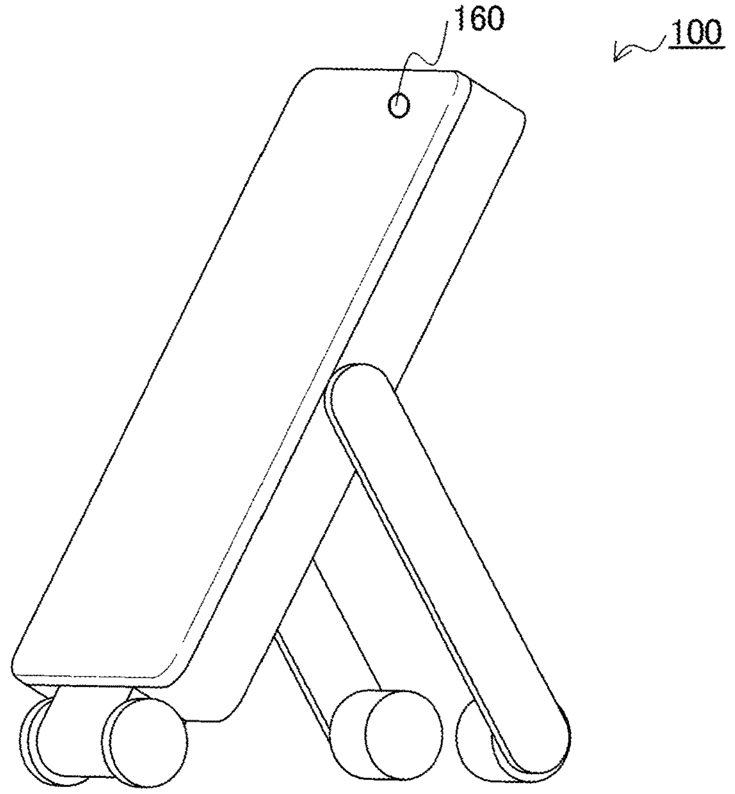
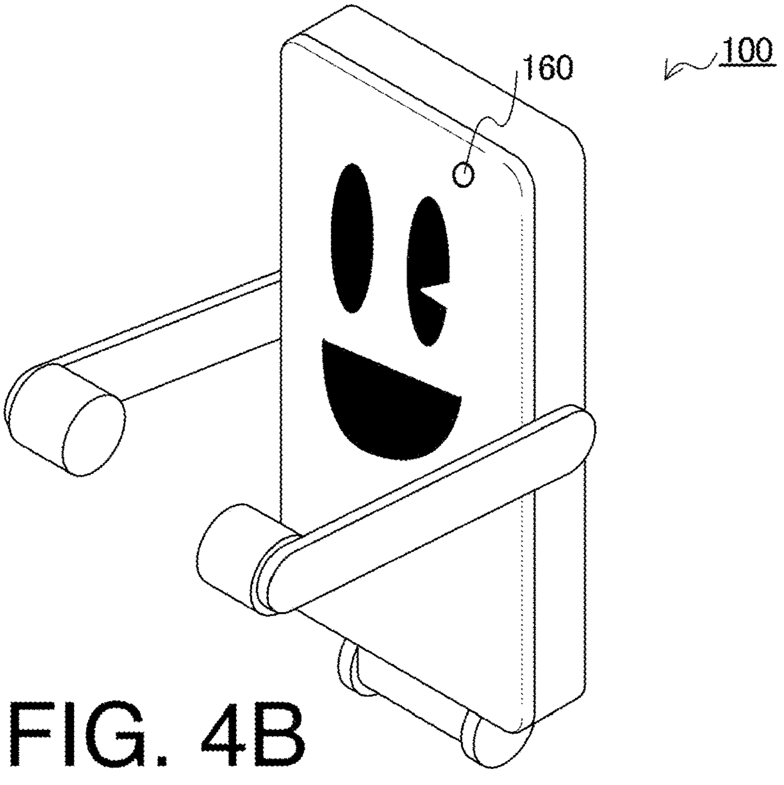
FIG. 4B

FIG. 8A
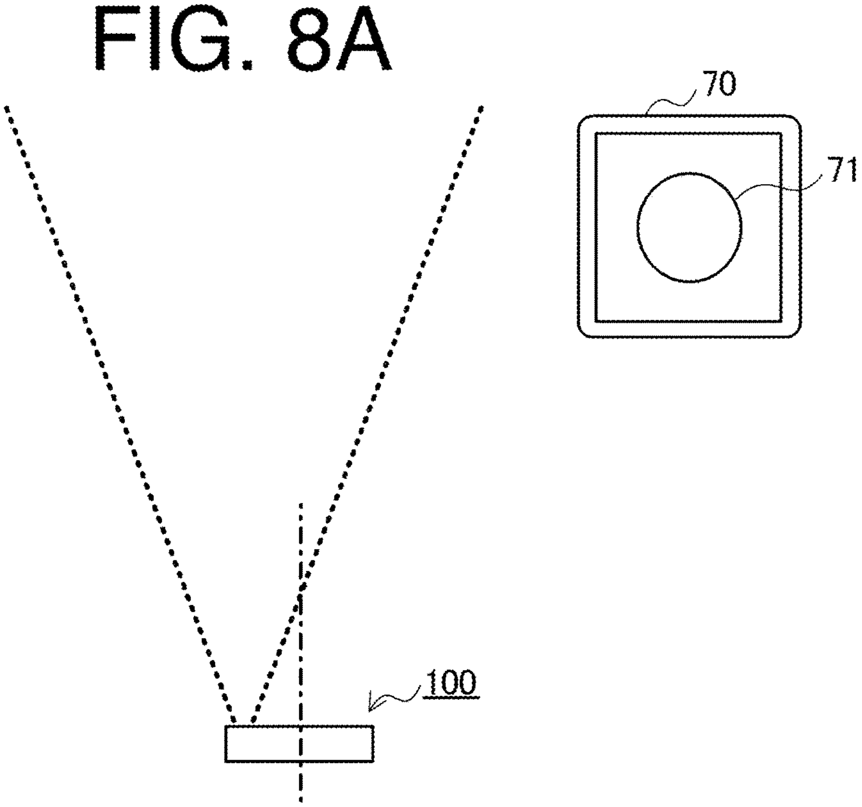
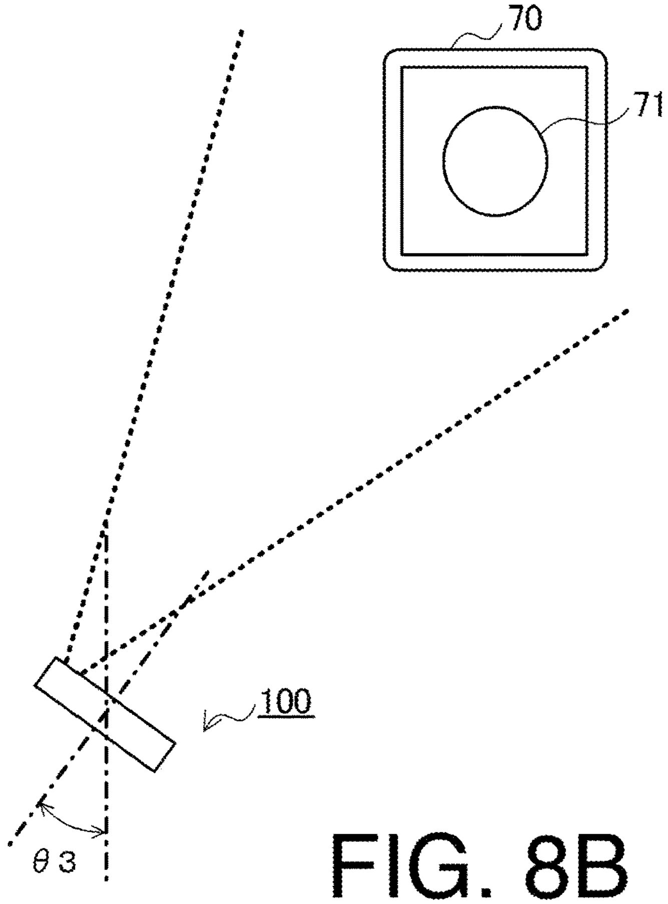
FIG. 8B

THIN MOBILE COMMUNICATION TERMINAL, AND CONTROL METHOD AND CONTROL PROGRAM THEREOF

TECHNICAL FIELD

This disclosure relates to a thin mobile communication terminal capable of operating as a robot and automatically being recharged, and a control method and control program thereof.

BACKGROUND

Various efforts have been made to provide a cell phone, which has become a familiar item for users, with a character to cause the users to feel more familiar. For example, PCT/JP2019/023711 (WO 2020/250434 A1) discloses a thin mobile communication terminal that can be used in a thin form, but can also serve as a robot. Also, Japanese Laid-Open Patent Publication No. 2006-236333 discloses a vacuum cleaner configured to be able to move independently and communicate sequentially with a charger so that if communication with the charger is lost, the cleaner can return to the position where communication was last established and return itself to the charger.

When the thin mobile communication terminal as described in PCT/JP2019/023711 (WO '434) above is driven as a robot, it naturally consumes power. Accordingly, it is desirable to have a configuration that automatically charges the battery in the thin mobile communication terminal. It is possible to allow a charger to have a communication function and communicate with a thin mobile communication terminal to guide it to the charger to perform charging as in JP2006-236333A above. However, a problem is in that it may be hard to employ the configuration of JP2006-236333A above if the automatic charging above is using an existing OS or application for a thin mobile communication terminal in a manner compliant with existing communication devices such as smart phones.

It could therefore be helpful to provide a thin mobile communication terminal that can be driven as a robot that can be automatically recharged, and a control method and control program thereof.

SUMMARY

We thus provide a thin mobile communication terminal that includes: a rectangular enclosure; two arms wherein one end of each arm is rotationally supported by a rotary shaft against corresponding one of both side surfaces of long sides of the enclosure; a hand at another end of each arm; a leg provided on one side surface of short sides of the enclosure in an independently movable manner; a rotary motor that rotates the rotary shaft that supports corresponding one of the two arms on one end of the corresponding one of the arms; an imaging unit provided on a main surface of the enclosure; and a controller that controls the rotary motor. The controller determines whether a charger is included in an image captured by the imaging unit, and if it determines that the charger is not included in the captured image, the controller drives the rotary motor to change an angle of view of the imaging unit in a vertical direction to search for the charger.

A method of controlling a thin mobile communication terminal includes: a rectangular enclosure; two arms wherein one end of each arm is rotationally supported by a rotary shaft against corresponding one of both side surfaces of long sides of the enclosure; a hand at another end of each arm; a leg provided on one side surface of short sides of the enclosure in an independently movable manner; a rotary motor that rotates the rotary shaft that supports corresponding one of the two arms on one end of the corresponding one of the arms; an imaging unit provided on a main surface of the enclosure; and a controller that controls the rotary motor, where the method includes the steps of: performing imaging by the imaging unit; determining whether a charger is included in a captured image obtained in the imaging step; changing an angle of view of the imaging unit in a vertical direction by driving the rotary motor if it is determined that the charger is not included in the captured image; moving the terminal toward the charger if the charger is included in the captured image; and receiving charging by the charger.

A program causes a computer of a thin mobile communication terminal including: a rectangular enclosure; two arms wherein one end of each arm is rotationally supported by a rotary shaft against corresponding one of both side surfaces of long sides of the enclosure; a hand at another end of each arm; a leg provided on one side surface of short sides of the enclosure in an independently movable manner; a rotary motor that rotates the rotary shaft that supports corresponding one of the two arms on one end of the corresponding one of the arms; an imaging unit provided on a main surface of the enclosure; and a controller that controls the rotary motor, to embody the functions of: performing imaging by the imaging unit; determining whether a charger is included in a captured image obtained by the imaging function; changing an angle of view of the imaging unit in a vertical direction by driving the rotary motor if it is determined that the charger is not included in the captured image; moving the terminal toward the charger if the charger is included in the captured image; and receiving charging by the charger.

In addition, in the thin mobile communication terminal above, the leg may include: a first rotary shaft with an axis direction in a direction of the short sides of the enclosure; a second rotary shaft coaxial with the first rotary shaft; a right wheel at one end of the first rotary shaft; a left wheel at one end of the second rotary shaft; a first traveling motor provided at another end of the first rotary shaft and drives the right wheel; and a second traveling motor provided at another end of the second rotary shaft and drives the left wheel. If the controller further determines that the charger is not included in the image captured by the imaging unit, the controller may drive the first traveling motor and second traveling motor to change an angle of view of the imaging unit in a horizontal direction to search for the charger.

Further, if the controller determines that the charger is included in the captured image, the controller may drive the first traveling motor and second traveling motor to move the terminal toward the charger on the basis of a position of the charger in the captured image.

Moreover, the imaging unit may perform sequential imaging while the terminal moving toward the charger, and the controller may rotate the rotary motor so that the charger is included in a captured image each time the imaging unit images.

Furthermore, the controller may stop the first and second traveling motors if a rotation angle of the rotary motor reaches a predetermined angle.

In addition, the controller may stop the first traveling motor and second traveling motor if a predetermined object on the charger is present in the image captured by the imaging unit.

Further, the thin mobile communication terminal may further include: a storage battery; and a charging unit that charges the storage battery with electric power. The charging unit may receive a wireless power supply from the charger and charge the storage battery.

The thin mobile communication terminal may include a hand and a leg, and the leg is configured to be able to move independently, thus providing a mobile communication terminal that is capable of operating as a robot without compromising portability.

BRIEF DESCRIPTION OF THE DRAWINGS

Features, advantages, and technical and industrial significance of examples will be described below with reference to the accompanying drawings, in which like numerals denote like elements.

FIG. 2A is a plan view illustrating the mobile communication terminal.

FIG. 2B is a top view illustrating the mobile communication terminal.

FIG. 2C is a bottom view illustrating the mobile communication terminal.

FIGS. 3A and 3B each are a left side view illustrating the mobile communication terminal.

FIGS. 4A and 4B are external views illustrating an example of driving the mobile communication terminal.

FIGS. 8A and 8B illustrate a relationship between an angle of view from a top of the mobile communication terminal and the charger.

DESCRIPTION OF THE REFERENCE NUMERALS

100, 100*a*, 100*b*: Mobile Communication Terminal
10: Enclosure
11: Arm (Left Arm)
11*a*: Rotary Shaft
11*b*: Arm Plate
11*c*: Rotary Shaft
11*d*: Hand
12: Arm (Right Arm)
12*a*: Rotary Shaft
12*b*: Arm Plate
12*c*: Rotary Shaft
12*d*: Hand
13: Leg
13*a*: Protrusion
13*b*: Right Wheel
13*c*: Left Wheel
13*d*: First Traveling Motor
13*e*: Rotary Shaft
13*f*: Second Traveling Motor
13*g*: Rotary Shaft
15, 16: Rotary Motor
110: Communication Unit
120: Storage
130: Input Unit
140: Display
150: Audio Output Unit
160: Imaging Unit
170: Power Supply
180: Charging Unit
190: Controller

DETAILED DESCRIPTION

Examples

A mobile communication terminal 100 is directed to a thin portable communication device represented by a smartphone or tablet terminal as well as a device also capable of serving as a robot, which can also be described as a mobile portable terminal. This example describes a method that allows automatic recharging to be performed using existing software in mobile communication terminals in which new configuration is added as little as possible. An example of a mobile communication terminal will be described below with reference to the drawings.

Configuration

Configuration of Mobile Communication Terminal 100

Figure 1A:
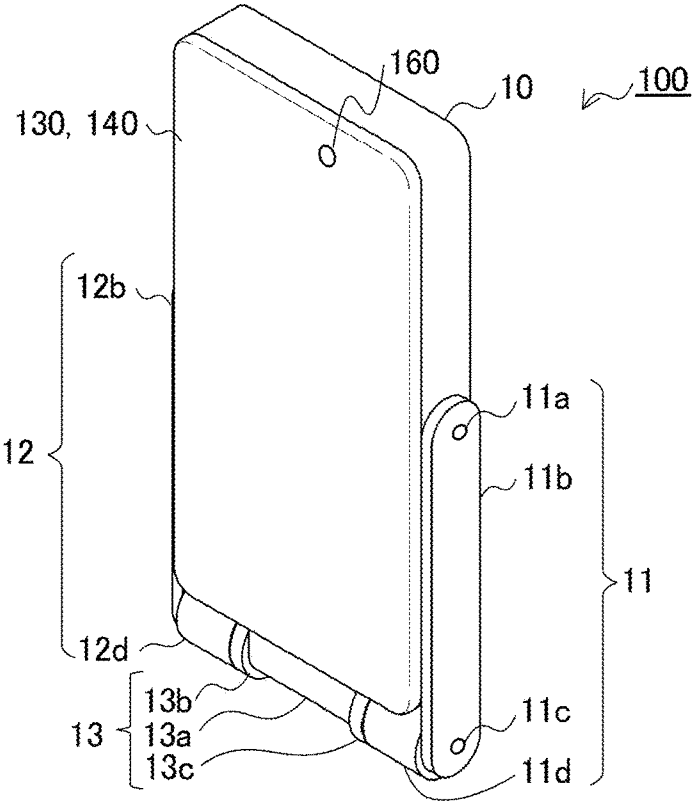
FIG. 1A is a perspective view illustrating an appearance of a mobile communication terminal viewed from a front side.
Figure 1B:
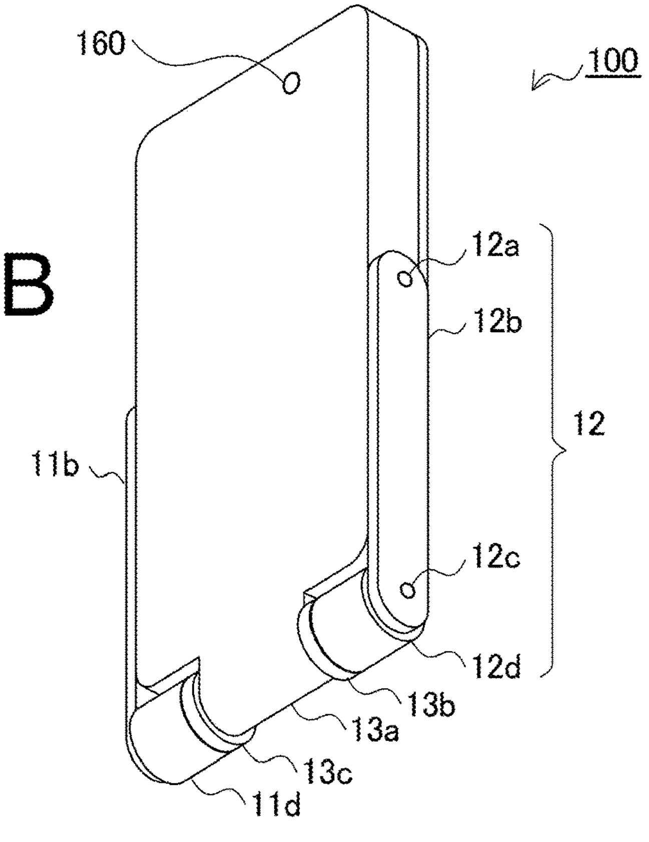
FIG. 1B is a perspective view illustrating the appearance of the mobile communication terminal viewed from a rear side.

First, with reference to FIGS. 1A to 3B, the configuration of the mobile communication terminal 100 will be described. FIG. 1A is a perspective view illustrating the mobile communication terminal 100 viewed from the front side, and FIG. 1B is a perspective view illustrating the mobile communication terminal 100 viewed from the rear side. FIG. 2A is a plan view illustrating the mobile communication terminal 100 viewed from the front side, FIG. 2B is a top view illustrating the mobile communication terminal 100, and FIG. 2C is a bottom view illustrating the mobile communication terminal 100. FIG. 3A is a left side view illustrating the mobile communication terminal 100, and FIG. 3B is a right side view illustrating the mobile communication terminal 100.

As shown in FIGS. 1A to 3B, the mobile communication terminal 100 includes a rectangular enclosure 10, two arms 11 and 12, one end of each of which is rotationally and freely supported with respect to a corresponding side surface of the long sides, hands 11*d* and 12*d* on the corresponding other ends of the two arms 11 and 12, and autonomous movable leg 13 provided on one of the short sides of the enclosure 10.

As shown in FIGS. 2A to 2C, the enclosure 10 of the mobile communication terminal 100 includes a rotary motor 15 inside it, which freely rotates the rotary shaft 11*a* in clockwise and counterclockwise directions. The rotary motor 15 is driven by electric power supplied from the power supply (not shown) of the mobile communication terminal 100 and controlled by a controller 190 of the mobile communication terminal 100 (described in detail below). The rotary shaft 11*a* is connected (fixed) to one end of an arm plate 11*b*. The arm plate 11*b* corresponds to a flat plate member parallel to the long side of the enclosure 10. When the rotary shaft 11*a* is rotated by the rotary motor 15, the arm plate 11*b* is also rotated about the rotary shaft 11*a*. A rotary shaft 11*c* is connected (fixed) to the other end of the arm plate 11*b*, and a hand 11*d* is connected to the rotary shaft 11*c* in a rotational manner. The hand 11*d* freely rotates about the rotary shaft 11*c*. The arm 11 serves as a left arm in the mobile communication terminal 100.

In the same manner, the enclosure 10 of the mobile communication terminal 100 includes a rotary motor 16 inside it, which freely rotates the rotary shaft 12*a* in clockwise and counterclockwise directions. In the same manner as in the rotary motor 15, the rotary motor 16 is also driven by electric power supplied from the power supply (not shown) of the mobile communication terminal 100 and controlled by the controller 190 of the mobile communication terminal 100 (described in detail below). The rotary shaft 12*a* is connected (fixed) to one end of an arm plate 12*b*. The arm plate 12*b* corresponds to a flat plate member parallel to the long side of the enclosure 10. When the rotary shaft 12*a* is rotated by the rotary motor 16, the arm plate 12*b* is also rotated about the rotary shaft 12*a*. A rotary shaft 12*c* is connected (fixed) to the other end of the arm plate 12*b*, and a hand 12*d* is connected to the rotary shaft 12*c* in a rotational manner. The hand 12*d* freely rotates about the rotary shaft 12*c*. The arm 12 serves as a right arm in the mobile communication terminal 100.

The mobile communication terminal 100 includes a protrusion 13*a* configured to protrude from the enclosure 10. As shown in FIGS. 2A to 2C, the protrusion 13*a* includes therein a first traveling motor 13*d* and a second traveling motor 13*f*. The first traveling motor 13*d* is driven by electric power supplied from the power source of the mobile communication terminal 100, and freely rotates a rotary shaft 13*e*. The second traveling motor 13*f* is driven by electric power supplied from the power source of the mobile communication terminal 100, and freely rotates a rotary shaft 13*g*. The first traveling motor 13*d* and the second traveling motor 13*f* are controlled independently. As understood from FIGS. 2A to 2C, both the rotary shaft 13*e* and the rotary shaft 13*g* are parallel to the short side of the enclosure 10.

A right wheel 13*b* is connected (fixed) to the rotary shaft 13*e*, and the right wheel 13*b* rotates in accordance with the rotation of the rotary shaft 13*e*. In the same manner, a left wheel 13*c* is connected (fixed) to the rotary shaft 13*g*, and the left wheel 13*c* rotates in accordance with the rotation of the rotary shaft 13*g*. The leg 13 is configured by the protrusion 13*a*, the first traveling motor 13*d* and the second traveling motor 13*f*, the corresponding rotary shaft 13*e* and rotary shaft 13*g*, and the right wheel 13*b* and the left wheel 13*c* that are rotated by the corresponding rotary shafts 13*e* and 13*g*.

As shown in FIGS. 1A to 3B, the leg 13 is configured to be located between the hands 11*d* and 12*d* when the arm 11 is located at a superimposed and aligned position with respect to the enclosure 10 in a lateral view.

Further, as shown in FIGS. 3A and 3B, the mobile communication terminal 100 is configured to be flat when the arm 12 is in a position superimposed on the enclosure 10. This may also be applied to the arm 11. That is, the width L2 of the arm plate 12*b* of the arm 12 is configured to be less than or equal to the thickness L1 of the enclosure 10. Accordingly, the arm plate 12*b* is thinner than the enclosure 10 in the thickness direction of the enclosure 10, and the mobile communication terminal 100 is compactly configured as a whole. This may also be applied to the arm 11.

Further, the hand 12*d* is configured to have a size, i.e., the diameter L3 less than or equal to the thickness L1 of the enclosure 10. In the same manner, the hand 11*d* is configured to have a diameter less than or equal to the thickness L1 of the enclosure 10, and the diameter of the hand 11*d* is the same as that of the hand 12*d*. The hands 11*d* and 12*d* are configured to have a size less than or equal to the thickness of the enclosure 10, configuring the entire mobile communication terminal 100 thinner and improving the portability of the mobile communication terminal 100.

Such a mobile communication terminal 100 may be driven in the manner shown in FIGS. 4A and 4B, for example. FIGS. 4A and 4B each illustrate an example of the operation of the mobile communication terminal 100. FIG. 4A illustrates an example of a mobile communication terminal 100 traveling. As shown in FIG. 4A, the mobile communication terminal 100 is capable of moving (running) powered by the right wheel 13*b* and left wheel 13*c* of the leg 13. At this time, the mobile communication terminal 100 is allowed to be moved in a stable condition by causing the hands 11*d* and 12*d* to serve as auxiliary wheels to contact the ground. In the example in FIG. 4A, the hands 11*d* and 12*d* are in contact with the ground so that they are located on the rear side of the mobile communication terminal 100, but this could also be the front side. That is, the mobile communication terminal 100 may move with its arms in front of it.

FIG. 4B illustrates an example of another form of the mobile communication terminal 100. The mobile communication terminal 100 is caused to stand by itself on the basis of the balance control (i.e., inverted pendulum) by the motors of the right and left wheels 13*b* and 13*c* and the arms 11 and 12, and can also be represented as a robot by displaying, for example, a face and body on the display while moving the arms 11 and 12. As shown in FIG. 4B, the mobile communication terminal 100 is capable of standing by itself and even moving around in this state using the principle of inverted pendulum.

Functional Configuration

As mentioned above, the mobile communication terminal 100 corresponds to a general mobile communication terminal such as a smartphone or tablet terminal, and as shown in FIGS. 1A and 2A, a touch panel that functions as an input unit 130 and display 140 are provided on a surface of the terminal, and an imaging unit 160, namely, a camera is also provided. As shown in FIG. 1B, the imaging unit 160 may also be provided on the rear side of the mobile communication terminal 100 (opposite the side on which the display 140 is provided). The functional configuration of the mobile communication terminal 100 will be described below.

Figure 5:
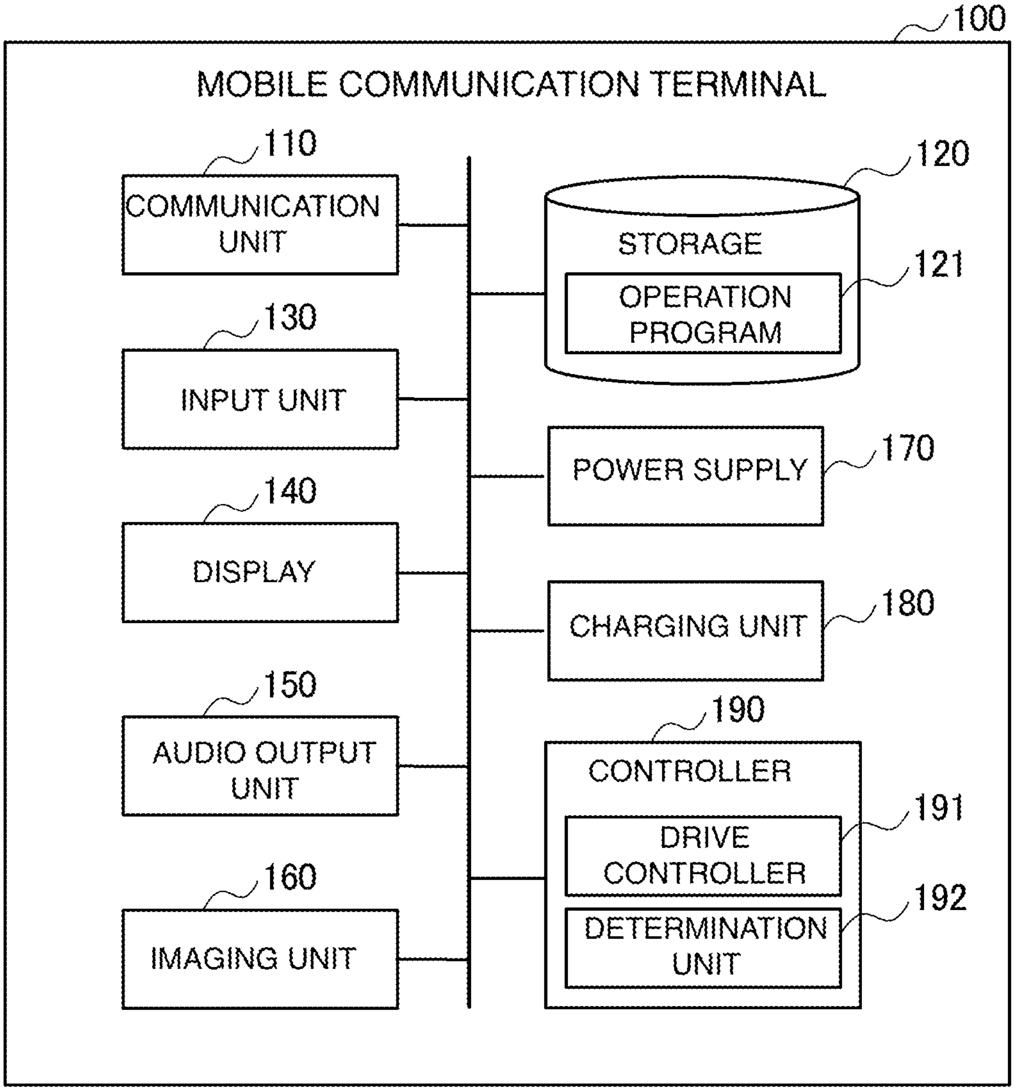
FIG. 5 is a block diagram illustrating an example of a functional configuration of the mobile communication terminal.

FIG. 5 is a block diagram illustrating an example of the functional configuration of the mobile communication terminal 100. As shown in FIG. 5, the mobile communication terminal 100 includes a communication unit 110, storage 120, input unit 130, display 140, audio output unit 150, imaging unit 160, power supply 170, charging unit 180, and controller 190.

The communication unit 110 is directed to a communication interface that serves to receive information from other devices via a network. The communication unit 110 communicates the received information to the controller 190. The communication unit 110 also transmits information instructed by the controller 190 to external devices. The communication unit 110 is capable of exchanging electronic information such as e-mail where it serves as a mobile communication terminal, website information where the user browses the Internet, and audio signals where the user makes a phone call.

The storage 120 serves to store various programs and data required by the mobile communication terminal 100 to operate. The storage 120 may be, for example, various recording media such as hard disk drive (HDD), solid state drive (SSD), and flash storage. The storage 120 stores an operation program 121 for the mobile communication terminal 100 to operate as a robot. The operation program 121 includes a process that searches for a charger that is capable of wirelessly charging the mobile communication terminal 100 and moves to the location of the charger.

The input unit 130 serves to receive input from the user. The input unit 320 can be a touch panel, for example, but is not limited to the touch panel. The input unit 130 communicates the input contents received from the user to the controller 190. The input unit 130 may accept voice input, where the input unit 130 can be a microphone. Further, the input unit 130 may be other hardware keys.

The audio output unit 150 outputs the audio signals in accordance with the instructions from the controller 190. The audio output unit 150 may be, for example, a speaker. The audio output unit 150 may, for example, output audio as lines of a robot. The audio output unit 150 may also output audio from a phone call.

The imaging unit 160 is directed to a camera that captures images of the surroundings in accordance with the instructions from the input unit 130 and the controller 190. An example in which the imaging unit 160 is provided on the front side of the mobile communication terminal 100 is illustrated, but this may be provided on the rear side or on both sides.

The power supply 170 is directed to a battery that serves to supply power to drive the various portions of the mobile communication terminal 100. The power supply 170 is directed to a chargeable/dischargeable battery, typically, a lithium-ion battery, but it is not limited thereto.

The charging unit 180 serves to receive transmitted power supply from an external charger (wireless charger) and charge the power supply 170 with the received power supply. The external charger performs the charging by wireless charging.

The controller 190 controls various portions of the mobile communication terminal 100 and may be, for example, a central processing unit (CPU), microprocessor, ASIC, and FPGA. The controller 190 is not limited to these examples, and may be any portion if it controls the mobile communication terminal 100. The controller 190 reads and executes various programs including the operation program 121 stored in the storage 120 to embody the functions to be performed by the mobile communication terminal 100. The controller 190 executes the process of moving toward the charger and executing charging under predetermined conditions. The controller 190 may also execute the process in accordance with the instructions by the user entered through the input unit 130. The controller 190 may also execute the process of information communicated by the communication unit 110.

The controller 190 includes a drive controller 191 and a determination unit 192 as functions to be implemented by the mobile communication terminal 100.

The drive controller 191 controls the arms 11, 12, and leg 13 when the mobile communication terminal 100 serves as a robot. The drive controller 191 controls the rotary motor 15 that operates the arm 11, the rotary motor 16 that operates the arm 12, the first traveling motor **13*d* that operates the right wheel 13*b*, and the second traveling motor 13*f* that operates the left wheel 13*c* in accordance with the movement information 123 that defines a predetermined movement pattern to allow the mobile communication terminal 100 to operate as if it is a robot. For example, the drive controller 191 is capable of advancing the mobile communication terminal 100 by rotating the first traveling motor 13*d* and the second traveling motor 13*f* both counterclockwise when viewed from the right side, and is capable of retreating the mobile communication terminal 100 by rotating them both clockwise when viewed from the right side. The drive controller 191 is also capable of rotating the mobile communication terminal 100 in place by rotating the first traveling motor 13*d* and the second traveling motor 13*f* in opposite directions. The drive controller 191 is capable of changing the angle between the main surface of the mobile communication terminal 100 including the imaging unit 160 and the ground surface by controlling the rotary motor 15 that operates the arm 11 and the rotary motor 16 that operates the arm 12, thereby changing the vertical angle of view (imaging direction) of the imaging unit 160. The angle of view in the horizontal direction (imaging direction) may be changed by rotating the right wheel 13*b* and left wheel 13*c***.

The determination unit 192 determines whether a charger capable of charging the power supply 170 of the mobile communication terminal 100 is present in the captured image taken by the imaging unit 160. The determination unit 192 determines whether a charger is included in the captured image by determining whether a marker provided on the charger is included in the captured image, but the method of determining whether a charger is included in the captured image is not limited to this. Other methods are described below as variations.

The functional configuration of the mobile communication terminal 100 is described above.

Operation

Figure 6:
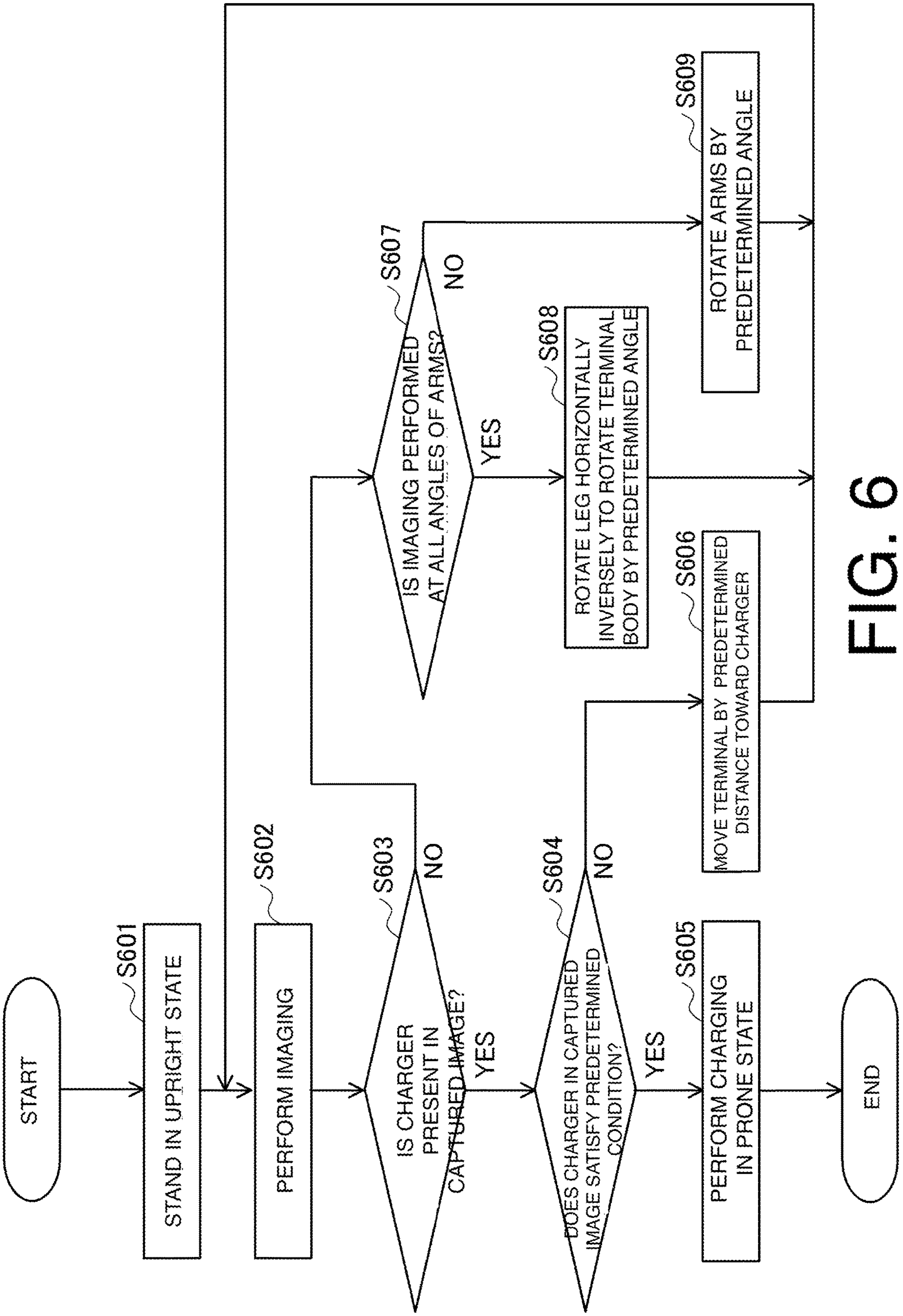
FIG. 6 is a flowchart illustrating an example of operation during automatic charging of the mobile communication terminal.

FIG. 6 is a flowchart illustrating an example of an operation of an automatic charging process by the mobile communication terminal 100.

The mobile communication terminal 100 may move toward the charger to perform charging under various conditions. Various conditions may include, for example, where a predetermined amount of time elapses without any input from the user of the mobile communication terminal 100, or where the amount of power in the power supply 170 falls below a predetermined threshold, or even any random situation.

If the controller 190 of the mobile communication terminal 100 determines to perform charging, the drive controller 191 causes the mobile communication terminal 100 to stand in an upright state (step S601).

The controller 190 causes the imaging unit 160 to perform imaging (step S602). The imaging unit 160 communicates the captured image obtained through the imaging to the controller 190.

The determination unit 192 determines whether a charger is present in the transmitted captured image (step S603). If the determination unit 192 determines that the charger is not present in the captured image (NO in step S603), the controller 190 determines whether the imaging has been performed at all angles of the arms 11 and 12 (step S607). The imaging at all angles of the arms 11 and 12 may be a determination of whether imaging has been performed at all of a predetermined number of angles so that imaging by the mobile communication terminal 100 in the vertical direction can be performed in a somewhat exhaustive manner.

If imaging has been performed at all angles of the arms (YES in step S607), the drive controller 191 rotates the main body of the mobile communication terminal 100 by a predetermined angle by rotating the right wheel **13*b* and the left wheel 13*c* in opposite directions, respectively, by a predetermined angle (step S608), and returns to the process in step S602. If imaging at all angles of the arms is not performed (NO in step S607), the drive controller 191 rotates the rotary motors 15 and 16 of the arms 11 and 12 by a predetermined angle, respectively (step S609) to change the vertical imaging direction by the imaging unit 160 of the mobile communication terminal 100. The process then returns to step S602**.

In contrast, if the determination unit 192 determines that a charger is present in the captured image (YES in step S603), the controller 190 determines whether the charger in the captured image satisfies a predetermined condition (step S604). The predetermined condition is directed to a condition for determining whether the mobile communication terminal 100 is within a range of receiving wireless power supply from the charger. As an example, the predetermined condition may be such that the marker is captured at a predetermined size or greater in the captured image, and that the arms 11 and 12 are at a predetermined angle (the mobile communication terminal 100 is in a state close to a prone state). The state in which the arms 11 and 12 are at a predetermined angle close to the prone state and the marker can be imaged at a predetermined size or greater may be recognized to correspond to a state in which the mobile communication terminal 100 is almost directly above the marker on the charger and is close enough from the charger.

If it is determined that the charger in the captured image does not satisfy the predetermined condition (NO in step S604), the drive controller 191 drives the first traveling motor 13*d* and the second traveling motor 13*f* to move the terminal 100 by a predetermined distance toward the charger (step S606) and the process returns to step S602. If it is determined that the charger in the captured image satisfies the predetermined condition (YES in step S604), the drive controller 191 controls the arms 11 and 12 so that the mobile communication terminal 100 is in the prone state, and the charging unit 180 receives wireless power supply from the charger to charge the power supply 170 (step S605). The process is then terminated when charging is complete. The automatic charging process by the mobile communication terminal 100 is described above. In FIG. 6, the image is captured every time the terminal 100 moves a predetermined distance, but the image captured by the imaging unit 160 may be a moving image, and once the charger 70 is recognized in the captured image, the drive controller 191 of the controller 190 may control the wheels and arms to allow the terminal 100 to automatically detect the charger 70 in the captured image and approach it. As the terminal 100 approaches the charger 70, the imaging unit 160 captures a more downward image, and by the time the terminal 100 is positioned close to the charger 70, the terminal 100 is in a state close to the prone state.

Figure 7A:
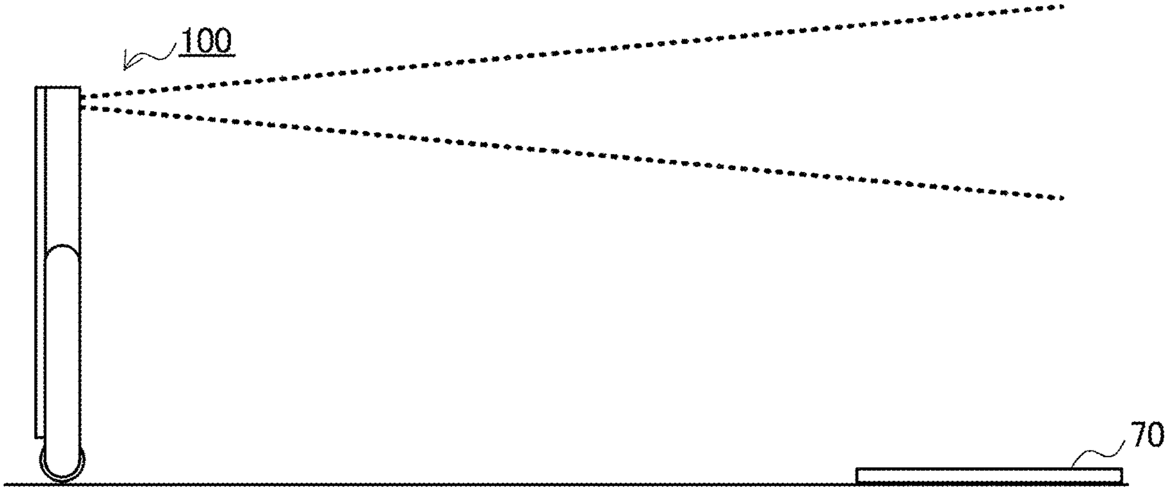
FIGS. 7A to 7C are diagrams illustrating a relationship between an angle of view from a side of the mobile communication terminal and a charger.
Figure 7B:
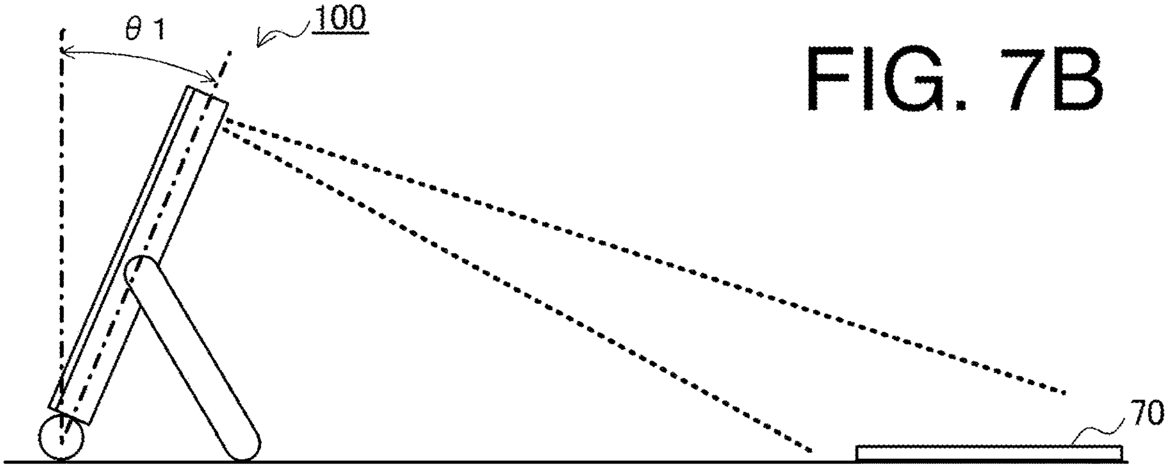
Figure 7C:
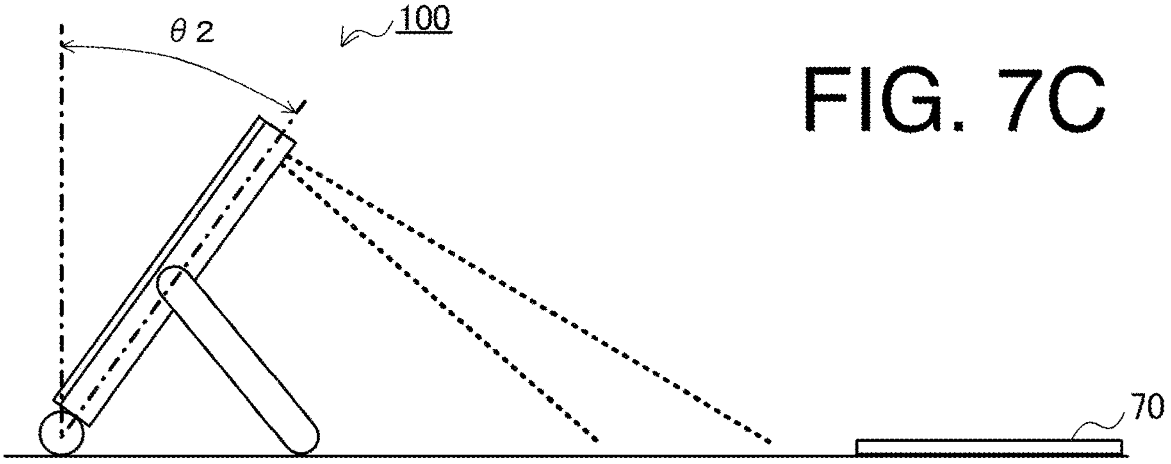

With reference to FIGS. 7A to 7C, the process in step S609 will be specifically described, and with reference to FIGS. 8A and 8B, the process in step S608 will be specifically described.

FIGS. 7A to 7C are diagrams illustrating a relationship between an angle of view from a side of the mobile communication terminal and the charger. FIG. 7A illustrates the mobile communication terminal 100 standing in an upright state, and the dotted line in the FIG. 7A indicates the angle of view (range of imaging) in the vertical direction by the imaging unit 160. In the example shown in FIG. 7A, the charger 70 is not included in the captured image. The angle of view shown in each of FIGS. 7A to 7C is an example and is not limited to this angle.

FIG. 7B illustrates the mobile communication terminal 100 inclined (inclined forward) by an angle θ1 from the upright state by slightly rotating the rotary motors 15 and 16 of the arms 11 and 12 to bring the arms 11 and 12 forward. That is, the state is transitioned from the state shown in FIG. 7A to the state shown in FIG. 7B by executing step S609. In the example of FIG. 7B, the charger 70 is included in the captured image.

In contrast, FIG. 7C illustrates the state in which the mobile communication terminal 100 is inclined from the upright state by an angle θ2 by further rotating the rotary motors 15 and 16 from the state shown in FIG. 7B, bringing the state of the mobile communication terminal 100 to be close to the prone state. In FIG. 7C, the charger 70 is not included in the captured image. In FIGS. 7A to 7C, an example is shown of searching for the charger 70 using the imaging unit 160 on the rear side of the mobile communication terminal 100 shown in FIG. 1B, but this searching may be performed using the imaging unit 160 on the front side shown in FIG. 1A, or both may be used. When performing charging, the mobile communication terminal 100 is basically placed on the charger 70 to allow the display 140 to be on the top such that the power transmitting antenna of the charger 70 is close to the power receiving antenna of the charging unit 180 of the mobile communication terminal 100. Accordingly, when the mobile communication terminal 100 captures the images and searches for the charger 70 in the manner shown in FIGS. 7A to 7C to reach the top of the charger 70, the display 140 can naturally face the top (as shown in FIG. 3B) and charging can be performed immediately. If the terminal can be placed with the surface on which the display 140 is provided as a bottom surface to perform charging, the display 140 may be placed as the bottom surface of the device, but it is preferable that the terminal be placed with the surface on which the display 140 is provided as a top surface since it is easier for the user to check the notification when an incoming e-mail or other such events is notified. In any event, it is preferable that the surface with the display 140 be placed as the top surface.

FIGS. 8A and 8B illustrate a relationship between an angle of view from a top of the mobile communication terminal and the charger. FIG. 8A illustrates the relationship between the charger 70 and the angle of view by the imaging unit 160 of the mobile communication terminal 100 when the mobile communication terminal 100 is standing in the upright state and viewed in the direction from the top.

The dotted line in FIG. 8A illustrates the angle of view of the imaging unit 160 in the horizontal direction. Further, the charger 70 includes a marker 71 as shown in FIG. 8A. The marker 71 may be configured by a different or more noticeable color than its surroundings, may have a special pattern drawn, or may use a retroreflective material to allow the terminal to find it. FIGS. 8A and 8B illustrate a form in which a circular marker 71 is provided in the center of the charger 70, but the shape of the marker 71 and the location of the marker 71 are not limited to the center of the charger 70. For example, the marker 71 may be square like a regular QR code (registered trademark).

In the example shown in FIG. 8A, the charger 70 is not included in the captured image.

In contrast, FIG. 8B illustrates a horizontally rotated state of the terminal in which the right wheel 13*b* is rotated rearward and the left wheel 13*c* is rotated forward by an angle θ3 from the state shown in FIG. 8A by processing in step S608. This allows the imaging direction of the imaging unit 160 to be changed in the horizontal direction. In the state shown in FIG. 8B, the charger 70 is included in the captured image.

That is, with respect to the examples of FIGS. 7A to 8B, in the states of FIG. 7B and FIG. 8B, the determination unit 192 determines that the charger 70 is included in the captured image.

As described above, the mobile communication terminal 100 can change the angles of the terminal in the vertical and horizontal directions by changing the angles of the arms 11 and 12 and rotating the right wheel 13*b* and left wheel 13*c*, and change the direction of imaging by the imaging unit 160 to embody the search for the charger by imaging.

Summary of Examples

According to the examples of the mobile communication terminal 100, the arms 11 and 12 corresponding to the arms can be driven to automatically change the imaging direction of the imaging unit 160 so that even if the charger 70 does not include a communication function, the mobile communication terminal 100, which functions as a robot, can search for the charger 70 and automatically move toward the charger 70 for charging with only the functions provided in the mobile communication terminal 100. In situations where the mobile communication terminal 100 is allowed to act freely as a robot, it naturally consumes power, but the mobile communication terminal 100 can perform charging by itself, reducing the time and efforts of the user. In addition, conventional mobile communication terminals may fail to be usable in an emergency if the user forgets to charge the battery, but this form of mobile communication terminal 100 reduces such risk.

Variation

The mobile communication terminals according to the above examples are not limited to the above examples, and may be other methods. Various examples of variations will be described below.

(1) In the above examples, the charger 70 may include a communication unit for teaching the location of the charger 70 to the mobile communication terminal 100 in place of the marker 71. The mobile communication terminal 100 may then identify the positional relationship between the terminal 100 and the charger 70 by executing communication with the charger 70, and move to the charger 70 to execute charging.

The charger 70 may include a device such as an ultrasonic wave generator in place of a communication unit, wherein the mobile communication terminal 100 is configured to be able to detect ultrasonic waves. The terminal may search for the charger 70 on the basis of the reception strength of the ultrasonic waves (the stronger the reception strength is, the closer the terminal is to the charger 70).

In place of the ultrasonic device, the charger 70 may be capable of performing infrared communication, wherein the mobile communication terminal 100 may retain infrared communication capability in the same manner to identify the positional relationship between it and the charger 70.

(2) In the above example, a configuration is described in which the marker 71 is attached to the mobile communication terminal 100 to allow the terminal 100 to easily search for the charger 70, but the marker 71 may be omitted. In this example, the mobile communication terminal 100 may retain information on the appearance of the charger 70 (images of the charger 70 captured from multiple different angles) and determine whether the charger 70 is included in the captured image by performing pattern matching with the captured image.

In place of the marker 71, the charger 70 itself may have a pattern painted on it that could serve as a marker. The mobile communication terminal 100 may read the pattern to identify the location of the charger 70. Alternatively, the charger 70 itself may be given a special coloring (coloring in a special color that is hard to be found in nature), and the terminal may be configured to determine whether the charger 70 is included in the captured image on the basis of whether the color is included in the captured image.

The marker 71 may correspond to a QR code, and the QR code may include an instruction to perform charging, and the mobile communication terminal 100 may be configured to start charging from the charger 70 upon receiving the charging instruction included in the QR code if the QR code is correctly read in the captured image. The correct reading of the QR code can be achieved by causing the imaging unit 160 to perform the image capturing in a manner as directly facing the QR code as possible. This can be achieved by a configuration in which the mobile communication terminal 100 is sufficiently close to the charger 70, and the state of the mobile communication terminal 100 is caused to be as close to the prone position as possible to capture the QR code. Therefore, in this example, the mobile communication terminal 100 may be recognized to be in a position to receive charging power supply from the charger 70, and charging can be started and performed without problems.

(3) In the example above, the processing shown in FIG. 6 starts from the state in which the mobile communication terminal 100 stands (as shown in FIG. 7A), but the processing may start from the state in which the mobile communication terminal 100 is inclined at a predetermined angle, in which situation the processing in step S609 may execute the arm rotation control in the direction of causing the state of the mobile communication terminal 100 to be closer to the standing state.

(4) In the processing in the example above shown in FIG. 6, the processing in steps S607 to S609 includes gradually changing the imaging direction in the vertical direction to capture the images to search for the charger, and if the charger is not included in the captured images, changing the imaging direction in the horizontal direction and then gradually changing the imaging direction in the vertical direction again to search for the charger, and vice versa. That is, the processing may include gradually changing the imaging direction in the horizontal direction to perform one round of imaging, and then slightly changing the angle in the vertical direction to perform one round of imaging again.

Figure 9A:
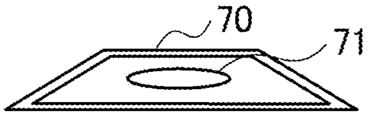
FIGS. 9A to 9C illustrate examples of forms of chargers.
Figure 9B:
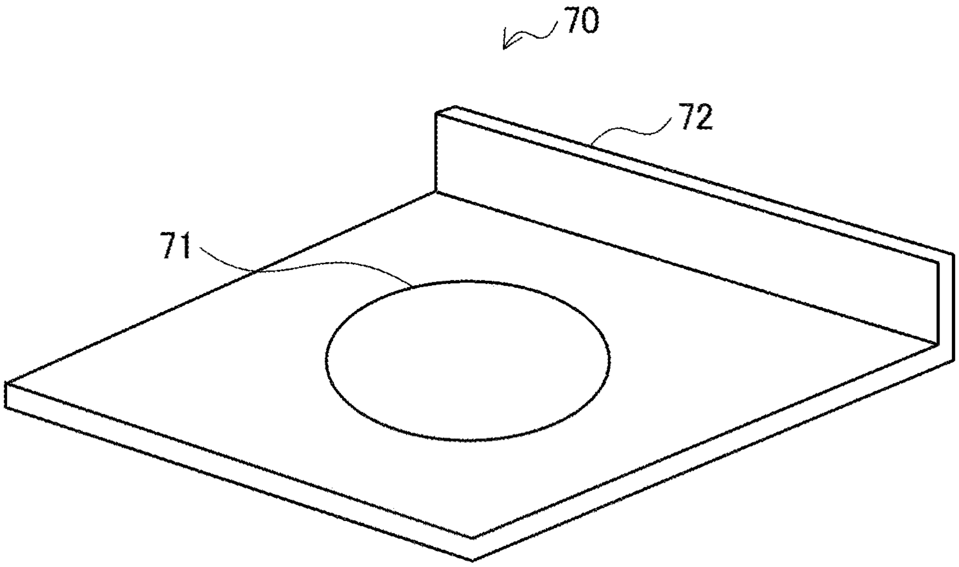
Figure 9C:
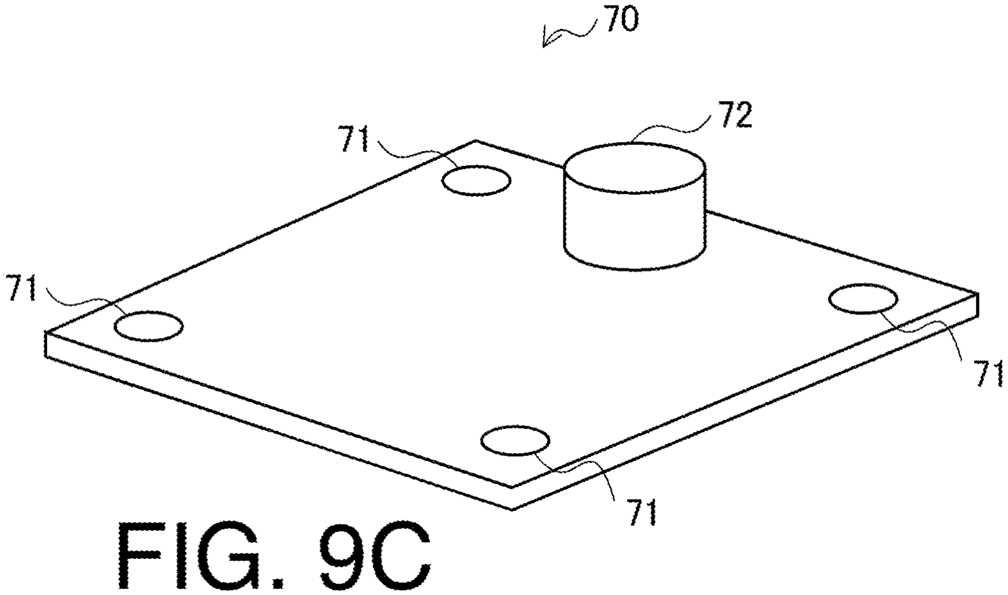

(5) In the examples above, the charger 70 is assumed to be a flat plate, but if the mobile communication terminal 100 is apart away from the charger 70, it may be captured in a state where it is hard to be recognized as the charger 70 from the captured image as shown in FIG. 9A, for example. Therefore, the charger 70 may be configured in three dimensions. That is, as illustrated in FIGS. 9B and 9C, the charger 70 may include a tab 72. The tab 72 may be colored by a special color different from the surroundings, have a particular pattern, be molded into a special shape, or be configured by a retroreflective material to allow the mobile communication terminal 100 to recognize that the charger 70 is in the captured image. In this way, the tab 72 may be provided on the flat plate portion to allow the mobile communication terminal 100 to easily find the charger 70 in the captured image. As described above, and as shown in FIG. 9C, the marker 71 may be located in a corner other than the center of the charger 70, and more than one marker 71 may be provided on the charger 70.

(6) The programs according to the examples may be provided as stored in a computer-readable storage medium. The storage medium is directed to a "non-transitory tangible medium" capable of storing programs. The storage medium may include any suitable storage medium such as an HDD or SSD, or a suitable combination of two or more of these. The storage medium may be volatile, nonvolatile, or a combination of volatile and nonvolatile. The storage medium is not limited to these examples and may be any device or medium if it is capable of storing programs.

The mobile communication terminal 100 is capable of embodying the functional units illustrated in the examples by reading programs stored in a storage medium and executing the read programs, for example. The programs may be provided through any transmission medium (such as communication network and broadcast wave) to the mobile communication terminal 100. The mobile communication terminal 100 may, for example, embody the functions of the multiple functional units illustrated in the examples by executing programs downloaded via the Internet or other means.

The programs may also be implemented using, for example, scripting languages such as ActionScript, and JavaScript (registered trademark), object-oriented programming languages such as Objective-C, and Java (registered trademark), and markup languages such as HTML5.

At least a part of the processing in the mobile communication terminal 100 may be by cloud computing configured by one or more computers. Each of the functional units of the mobile communication terminal 100 may be one or more circuits that embody the functions illustrated in the above examples, or multiple functional units may be a single circuit.

(7) Although the examples have been described on the basis of various drawings and examples, those skilled in the art would be able to make various changes and modifications on the basis of this disclosure. Accordingly, these variations and modifications are included within the scope of this disclosure. For example, the functions included in each method and step, for example, may be rearranged to be avoided to be logically inconsistent, and multiple methods and steps may be integrated or divided. The configurations shown in the examples above may be combined as appropriate.

INCORPORATION BY REFERENCE

This application is a continuation application of International Application No. PCT/JP2020/045546, filed on Dec. 7, 2020, the contents of which are hereby incorporated by reference in its entirety.

What is claimed is:

1. A mobile communication terminal comprising:
- a rectangular enclosure;
- two arms wherein one end of each arm is rotationally supported by a rotary shaft against corresponding one side surface of both side surfaces of long sides of the enclosure;
- a hand at another end of each arm;
- a leg provided on one of short sides of the enclosure in an independently movable manner, the leg comprising:
  - a first rotary shaft with an axis direction in a direction of the short sides of the enclosure;
  - a second rotary shaft coaxial with the first rotary shaft;
  - a right wheel at one end of the first rotary shaft;
  - a left wheel at one end of the second rotary shaft;
  - a first traveling motor provided at an opposing end of the first rotary shaft and configured to drive the right wheel; and
  - a second traveling motor provided at an opposing end of the second rotary shaft and configured to drive the left wheel;
- a rotary motor that rotates the rotary shaft that supports a corresponding one of the two arms on one end of the corresponding one of the arms;
- an imaging unit provided on a main surface of the enclosure; and
- a controller that controls the rotary motor, the first traveling motor, and the second traveling motor independently,
- wherein the controller determines whether a charger is included in an image captured by the imaging unit, and if the controller determines that the charger is not included in the captured image, the controller drives the rotary motor to change an angle of view of the imaging unit in a vertical direction to search for the charger, and
- wherein if the controller further determines that the charger is not included in the image captured by the imaging unit, the controller drives one or more of the first traveling motor or second traveling motor to change an angle of view of the imaging unit in a horizontal direction to search for the charger.

2. The mobile communication terminal according to claim 1, wherein, if the controller determines that the charger is included in the captured image, the controller drives the first traveling motor and second traveling motor to move the terminal toward the charger on the basis of a position of the charger in the captured image.

3. The mobile communication terminal according to claim 2, wherein
- the imaging unit performs sequential imaging while the terminal moving toward the charger, and
- the controller rotates the rotary motor so that the charger is included in a captured image each time the imaging unit images.

4. The mobile communication terminal according to claim 3, wherein the controller stops the first traveling motor and second traveling motor if a rotation angle of the rotary motor reaches a predetermined angle.

5. The mobile communication terminal according to claim 4, further comprising:
- a storage battery; and
- a charging unit that charges the storage battery with electric power, wherein
- the charging unit receives a wireless power supply from the charger and charges the storage battery.

6. The mobile communication terminal according to claim 3, wherein the controller stops the first traveling motor and second traveling motor if a predetermined object on the charger is present in the image captured by the imaging unit.

7. A method of controlling a mobile communication terminal, the mobile communication terminal comprising: a rectangular enclosure; two arms wherein one end of each arm is rotationally supported by a rotary shaft against corresponding one of both side surfaces of long sides of the enclosure; a hand at another end of each arm; a leg provided on one side surface of short sides of the enclosure in an independently movable manner, the leg comprising: a first rotary shaft with an axis direction in a direction of the short sides of the enclosure; a second rotary shaft coaxial with the first rotary shaft; a right wheel at one end of the first rotary shaft; a left wheel at one end of the second rotary shaft; a first traveling motor provided at an opposing end of the first rotary shaft and configured to drive the right wheel; and a second traveling motor provided at an opposing end of the second rotary shaft and configured to drive the left wheel; a rotary motor that rotates the rotary shaft that supports a corresponding one of the two arms on one end of the corresponding one of the arms; an imaging unit provided on a main surface of the enclosure; and a controller that controls the rotary motor, the method comprising:

performing imaging by the imaging unit;

determining whether a charger is included in a captured image obtained in the imaging step;

changing an angle of view of the imaging unit in a vertical direction by driving the rotary motor if it is determined that the charger is not included in the captured image;

determining that the charger is not included in a second image captured by the imaging unit;

driving one or more of the first traveling motor or the second traveling motor independently to change an angle of view of the imaging unit in a horizontal direction;

moving the terminal toward the charger if the charger is included in the captured image; and receiving charging by the charger.

8. A non-transitory computer readable medium storing therein a program causing a computer of a mobile communication terminal including: a rectangular enclosure; two arms wherein one end of each arm is rotationally supported by a rotary shaft against corresponding one of both side surfaces of long sides of the enclosure; a hand at another end of each arm; a leg provided on one side surface of short sides of the enclosure in an independently movable manner, the leg comprising: a first rotary shaft with an axis direction in a direction of the short sides of the enclosure; a second rotary shaft coaxial with the first rotary shaft; a right wheel at one end of the first rotary shaft; a left wheel at one end of the second rotary shaft; a first traveling motor provided at an opposing end of the first rotary shaft and configured to drive the right wheel; and a second traveling motor provided at an opposing end of the second rotary shaft and configured to drive the left wheel; a rotary motor that rotates the rotary shaft that supports a corresponding one of the two arms on one end of the corresponding one of the arms; an imaging unit provided on a main surface of the enclosure; and a controller that controls the rotary motor, to embody the functions of:

performing imaging by the imaging unit;

determining whether a charger is included in a captured image obtained by the imaging function;

changing an angle of view of the imaging unit in a vertical direction by driving the rotary motor if it is determined that the charger is not included in the captured image;

determining that the charger is not included in a second image captured by the imaging unit;

driving one or more of the first traveling motor or the second traveling motor independently to change an angle of view of the imaging unit in a horizontal direction;

moving the terminal toward the charger if the charger is included in the captured image; and receiving charging by the charger.

* * * * *